United States Patent [19]

Kumar

[11] Patent Number: 5,354,346
[45] Date of Patent: Oct. 11, 1994

[54] PURGE EFFLUENT REPRESSURIZED ADSORPTION PROCESS

[75] Inventor: Ravi Kumar, Allentown, Pa.

[73] Assignee: Air Products and Chemicals, Inc., Allentown, Pa.

[21] Appl. No.: 955,630

[22] Filed: Oct. 1, 1992

[51] Int. Cl.⁵ .................................. B01D 53/04
[52] U.S. Cl. .......................... 95/101; 95/130; 95/139; 95/140; 95/143
[58] Field of Search .................. 55/25, 26, 58, 62, 68, 55/74, 75

[56] References Cited

U.S. PATENT DOCUMENTS

| | | | |
|---|---|---|---|
| Re. 31,014 | 8/1982 | Sircar | 55/26 |
| 3,085,379 | 4/1963 | Kiyonaga et al. | 55/58 X |
| 3,788,037 | 1/1974 | Shell et al. | 55/58 |
| 4,171,207 | 10/1979 | Sircar | 55/26 |
| 4,566,881 | 1/1986 | Richter et al. | 55/58 X |
| 4,599,094 | 7/1986 | Werner et al. | 55/26 |
| 4,705,541 | 11/1987 | Sircar | 55/58 X |
| 4,775,394 | 10/1988 | Yamano et al. | 55/26 |
| 4,790,858 | 12/1988 | Sircar | 55/26 |
| 4,913,709 | 4/1990 | Kumar | 55/58 X |
| 4,914,218 | 4/1990 | Kumar et al. | 55/58 X |
| 4,915,711 | 4/1990 | Kumar | 55/26 |
| 4,986,835 | 1/1991 | Uno et al. | 55/26 |
| 5,026,406 | 6/1991 | Kumar et al. | 55/26 |
| 5,084,075 | 1/1992 | Sircar | 55/58 X |
| 5,133,785 | 7/1992 | Kumar et al. | 55/26 |

*Primary Examiner*—Robert Spitzer
*Attorney, Agent, or Firm*—Robert J. Wolff; James C. Simmons; William F. Marsh

[57] ABSTRACT

A pressure swing adsorption process is set forth for the recovery of two gas products at high recovery and high purity using the steps of adsorption, depressurization, low pressure purge, evacuation and repressurization. The purge effluent and a portion of the depressurization effluent are used to partially accomplish the repressurization step.

8 Claims, 1 Drawing Sheet

PURGE EFFLUENT REPRESSURIZED ADSORPTION PROCESS

FIELD OF THE INVENTION

The present invention is directed to a pressure swing adsorption process which uses a plurality of parallel adsorption beds to separate more readily adsorbed gas component(s) from less readily adsorbed gas component(s) in a gas mixture comprising the steps of adsorption, depressurization, low pressure purge, evacuation and repressurization.

1. Background of the Invention

Pressure swing adsorption (PSA) processes which use a plurality of parallel adsorption beds to separate more readily adsorbed gas component(s) from less readily adsorbed gas component(s) in a gas mixture comprising the steps of adsorption, depressurization, low pressure purge, evacuation and repressurization are known in the art. A state of the art example is the process taught in U.S. Pat. No. 5,026,406 which recovers two gas products at high recovery and high purity while using less power than any comparable process.

It is an object of the present invention to recover two products at high recovery and high purity using the steps of adsorption, depressurization, low pressure purge, evacuation and repressurization while using less power than any comparable process, including the state of the art process taught in U.S. Pat. No. 5,026,406.

2. Summary of the Invention

The present invention is an improvement to a pressure swing adsorption process for the recovery of two gas products at high recovery and high purity from a feed gas stream containing said products wherein a first gas product is one or more, less strongly adsorbed components and a second gas product is one or more, more strongly adsorbed components. The process to which the improvement of the present invention pertains comprises:

(a) introducing a feed gas stream at elevated pressure containing said one or more, less strongly adsorbed components and said one or more, more strongly adsorbed components into one of a plurality of parallel adsorptive beds filled with one or more adsorbents selective for said one or more, more strongly adsorbed components, so as to retain said one or more, more strongly adsorbed components on said one or more adsorbents and allow said one or more, less strongly adsorbed components to pass through said bed for recovery as said first gas product at high recovery and high purity;

(b) terminating the introduction of said feed gas stream into said bed before said one or more, more strongly adsorbed components break through the downstream end of said bed and depressurizing said bed to approximately ambient pressure to remove said one or more, less strongly adsorbed components from said bed and recycling at least a portion of the resulting depressurization effluent to said feed gas stream;

(c) passing a low pressure purge gas stream of one or more, more strongly adsorbed components through said bed to remove any residual one or more, less strongly adsorbed components from said bed;

(d) evacuating said bed to a subambient pressure to recover said one or more, more strongly adsorbed components as said second gas product at high recovery and high purity; and (e) repressurizing said bed with one or more, less strongly adsorbed components to approximately the pressure of the feed gas stream, wherein the steps (a) through (e) are performed on said plurality of beds to result in a continuous process.

The improvement increases the energy efficiency of the process and comprises a purge effluent repressurization step wherein said bed is partially repressurized after step (d) and prior to step (e) with the effluent from one of said parallel beds presently undergoing step (c).

In one embodiment of the present invention, the improvement further comprises a depressurization effluent repressurization step wherein said bed is partially repressurized after step (d) and prior to the purge effluent repressurization step with a last portion of the depressurization effluent from one of said parallel beds presently undergoing step (b).

DETAILED DESCRIPTION OF THE INVENTION

Figure 1:
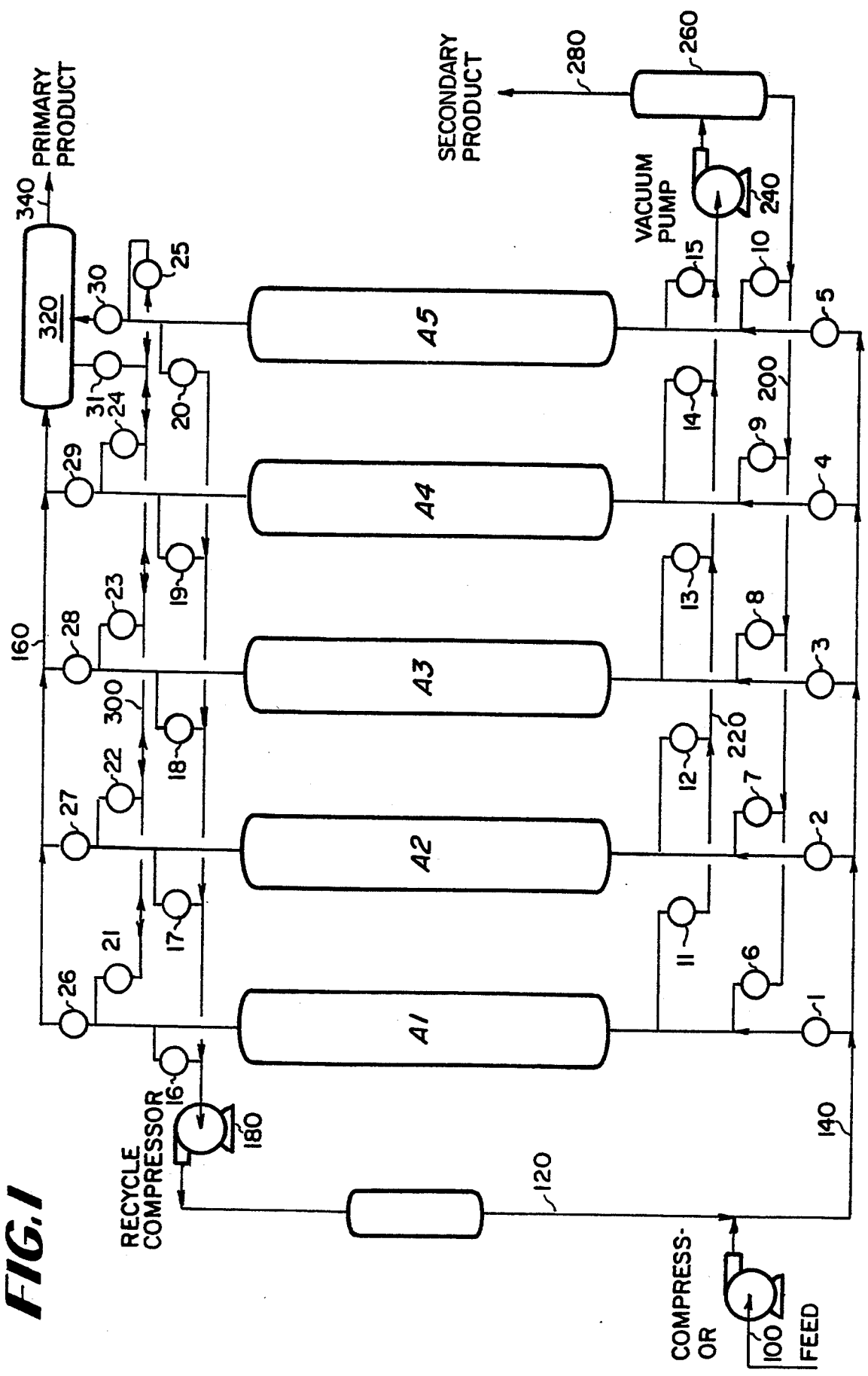
FIG. 1 is a schematic diagram illustrating one embodiment of the present invention.

To better understand the present invention, it is important to understand the prior art with respect to PSA processes which use a plurality of parallel adsorption beds to separate more readily adsorbed gas component(s) from less readily adsorbed gas component(s) in a gas mixture. A state of the art example is the following process taught in Claim 1 of U.S. Pat. No. 5,026,406 as follows:

"1. A pressure swing adsorption process for recovery of two gas products at high recovery and high purity from a feed gas stream containing said products wherein a first gas product is one or more, less strongly adsorbed components and a second gas product is one or more, more strongly adsorbed components, comprising:

(a) introducing a feed gas stream at elevated pressure containing said one or more, less strongly adsorbed components and said one or more, more strongly adsorbed components into one of a plurality of parallel adsorptive beds filled with one or more adsorbents selective for said one or more, more strongly adsorbed components, so as to retain said one or more, more strongly adsorbed components on said one or more adsorbents and allow said one or more, less strongly adsorbed components to pass through said bed for recovery as said first gas product at high recovery and high purity;

(b) terminating the introduction of said feed gas stream into said bed before said one or more, more strongly adsorbed components break through the downstream end of said bed and depressurizing said bed to approximately ambient pressure to remove said one or more, less strongly adsorbed components from said bed and recycling the resulting depressurization effluent to said feed gas stream;

(c) passing a low pressure purge gas stream of one or more, more strongly adsorbed components through said bed to remove any residual one or more, less strongly adsorbed components from said bed and recycling the resulting effluent from said purged bed to the feed gas stream;

(d) evacuating said bed to a subambient pressure to recover said one or more, more strongly adsorbed components as said second gas product at high recovery and high purity, and (e) repressurizing said bed with one or more, less strongly adsorbed components to approximately the pressure of the feed gas stream, wherein the steps (a) through (e) are performed on said plurality of beds to result in a continuous process."

The present invention is an improvement to the above process (hereinafter the "prior art process") which increases the energy efficiency of the process. The improvement comprises a purge effluent repressurization step wherein said bed is partially repressurized after step (d) and prior to step (e) with the effluent from one of said parallel beds presently undergoing step (c). In the prior art process, this effluent stream is recycled to the feed gas stream.

In one embodiment of the present invention, the improvement further comprises a depressurization effluent repressurization step wherein said bed is partially repressurized after step (d) and prior to the purge effluent repressurization step with a last portion of the depressurization effluent from one of said parallel beds presently undergoing step (b). In the prior art process, the entire portion of the depressurization effluent is recycled to the feed gas stream. The remaining initial portion of the depressurization effluent from step (b) continues to be recycled to the feed gas stream as in the prior art process. Typically, the first 90% of the depressurization effluent continues to be recycled to the feed while the last 10% is used for partial repressurization. Regardless of the split, the depressurization effluent used for partial repressurization is always a last portion of the depressurization effluent.

The purge effluent and depressurization effluent repressurization steps each increase the energy efficiency of the prior art process because the effluent streams in issue are no longer recycled to the feed as in the prior art process. As a result, these effluent streams no longer have to be compressed to feed pressure as in the prior art process. The skilled practitioner will appreciate that the tradeoff is the efficiency of the adsorption step since the effluent gas being used to partially repressurize the bed consists primarily of the more strongly adsorbed component(s). (Ideally, the repressurization gas should consist only of the less strongly adsorbed component(s)). In particular, the effluent stream from the present invention's adsorption step (i.e. the "first gas product") will contain more of the more strongly adsorbed component(s) than in the prior art process. As a result, the purity of the less strongly adsorbed component(s) in the first gas product and the recovery of the more strongly adsorbed component(s) in the second gas product will both be less than in the prior art process. This negative impact on said purity and recovery is slight however since the volume of gas used in the partial repressurization step(s) is much smaller than the volume of gas used to complete the repressurization.

A first embodiment of the present invention consists of the following cycle of steps:
1. Adsorption
2. Depressurization
3. Low Pressure Purge
4. Evacuation
5. Purge Effluent Repressurization
6. Repressurization A second embodiment of the present invention consists of the following cycle of steps:
1. Adsorption
2. First Depressurization
3. Second Depressurization
4. Low Pressure Purge
5. Evacuation
6. Depressurization Effluent Repressurization
7. Purge Effluent Repressurization
8. Repressurization The steps in the above embodiments are carried out in two or more adsorbent beds with appropriate gas storage tanks. The process step sequence using five adsorbent beds for each of the above embodiments is listed in Tables 1 and 2, respectively. Other variations can be made to these basic steps. One example of such a variation is the introduction of a blowdown step after the low pressure purge step in case the low pressure purge step is carried out at pressure higher than ambient pressure. Another example is the introduction of one or more pressure equalization steps. Still another example is the introduction of "B" beds in series to the five existing "A" beds for a subsequent purification of the less strongly adsorbed component(s) as taught in U.S. Pat. No. 4,913,709. (The "B" beds are used when ultra-high purity of the less strongly adsorbed component(s) is desired; in such cases, the above described negative impact of the present invention on the purity of the less strongly adsorbed component(s) is non-existent.)

The process cycle for the first embodiment of the present invention will now be described in detail:

1. Adsorption Step, which consists of:
   (a) Flowing the feed gas stream at a pressure of approximately 30–500 psia and temperature of approximately 0°–300° F. through a bed packed with one or more adsorbents capable of selectively adsorbing the more strongly adsorbed component(s) from the feed gas stream.
   (b) Withdrawing an effluent stream of high purity less strongly adsorbed component(s) (the first gas product) from the downstream end of the bed.
   (c) Continuing steps 1(a) and 1(b) for a predetermined cycle time or until the concentration of the more strongly adsorbed component(s) in the effluent stream reaches a preset limit. The bed is now called "spent" because it has exhausted its capacity for adsorbing the more strongly adsorbed component(s) from the feed gas stream.

2. Depressurization Step, which consists of:
   (a) Discontinuing the feed gas stream flow through the "spent" bed and transferring the feed to a parallel bed on step 1(a) of this cycle.
   (b) Reducing the pressure in the spent bed to approximately 15 psia by venting the gas in the bed in a direction either opposite to or the same as the feed gas stream flow.
   (c) Raising the pressure of all the depressurized gas from step 2(b) to the same level as the feed gas stream pressure in step 1(a) by a compressor.
   (d) Mixing the gas from 2(c) with the fresh feed gas stream and feeding the mixed gas to a parallel bed on step 1(a) of this cycle.

3. Low Pressure Purge Step, which consists of:
   (a) Flowing a portion of the high purity more strongly adsorbed component(s) obtained from a parallel bed on step 4 of this cycle at approximately 15 psia through the depressurized bed in a direction either countercurrent or cocurrent to the feed gas stream flow.

(b) Withdrawing the effluent stream and introducing it to a parallel bed on step 5 of this cycle.

(c) Continuing steps 3(a) and 3(b) for a predetermined cycle time or until the concentration of the more strongly adsorbed component(s) in the effluent stream or the pressure of the parallel bed on step 5 of this cycle reaches a preset limit. The bed is now called "saturated."

4. Evacuation Step, which consists of:
   (a) Lowering the pressure of the saturated bed from approximately 15 psia to approximately 40–200 torr by evacuating the gas from the feed end of the bed or by simultaneously evacuating the gas from both the feed and the product ends of the bed.
   (b) Storing the evacuated gas which consists of the more strongly adsorbed component(s) at high purity (the second gas product) at ambient pressure for further use.
   (c) Part of this gas stream is used to low pressure purge a parallel bed on step 3(a) of this cycle.

5. Purge Effluent Repressurization Step, which consists of:
   (a) Discontinuing the pressure reduction of the bed. The bed is now called "regenerated" because its capacity for adsorbing the more strongly adsorbed gas component(s) has been restored.
   (b) Raising the pressure in the regenerated bed from evacuation level (40–200 torr) to a somewhat higher level (200–760 torr) by connecting the product or feed end of this bed with the effluent end of a parallel bed on step 3(b) of this cycle.
   (c) Discontinuing this step when the pressure in the regenerated bed or concentration of the more strongly adsorbed component(s) in the effluent from a parallel bed on step 3(b) of this cycle has reached a predetermined level or after a predetermined cycle time.

6. Repressurization Step, which consists of:
   (a) Further raising the pressure in the regenerated bed from the current level (200–760 torr) to adsorption level (30–500 psia) by connecting the product end of the regenerated bed with the product end of a parallel bed on step 1(b) of this cycle.
   (b) Discontinuing the above step when the pressure in the regenerated bed has reached the desired level.
   (c) This bed is now ready to undergo a new cycle starting at step 1(a) of this cycle.

The process cycle for the second embodiment of the present invention will now be described in detail:

1. Adsorption Step, which consists of:
   (a) Flowing the feed gas stream at a pressure of approximately 30–500 psia and temperature of approximately 0°–300° F. through a bed packed with one or more adsorbents capable of selectively adsorbing the more strongly adsorbed component(s) from the feed gas stream.
   (b) Withdrawing an effluent stream of high purity less strongly adsorbed component(s) (the first gas product) from the downstream end of the bed.
   (c) Continuing steps 1(a) and 1(b) for a predetermined cycle time or until the concentration of the more strongly adsorbed component(s) in the effluent stream reaches a preset limit. The bed is now called "spent" because it has exhausted its capacity for adsorbing the more strongly adsorbed component(s) from the feed gas stream.

2. First Depressurization Step, which consists of:
   (a) Discontinuing the feed gas stream flow through the "spent" bed and transferring the feed to a parallel bed on step 1(a) of this cycle.
   (b) Reducing the pressure in the spent bed to a somewhat lower level (approximately 20–50 psia) by venting the gas in the bed in a direction either opposite to or the same as the feed gas stream flow.
   (c) Raising the pressure of all the depressurized gas from step 2(b) to the same level as the feed gas stream pressure in step 1(a) by a compressor.
   (d) Mixing the gas from 2(c) with the fresh feed gas stream and feeding the mixed gas to a parallel bed on step 1(a) of this cycle.

3. Second Depressurization Step, which consists of:
   (a) Further reducing the pressure in the spent bed from the current level (approximately 20–50 psia) to approximately 15 psia by connecting the feed or product end of the bed with the feed or product end of a parallel bed on step 6 of this cycle.
   (b) Continuing step 3(a) for a predetermined time or until the pressure in the parallel bed on step 6 of this cycle has reached a predetermined low level (200–500 torr).

4. Low Pressure Purge step, which consists of:
   (a) Flowing a portion of the high purity more strongly adsorbed component(s) obtained from a parallel bed on step 5 of this cycle at approximately 15 psia through the depressurized bed in a direction either countercurrent or cocurrent to the feed gas stream flow.

TABLE 1

| PROCESS STEP SEQUENCE FOR FIRST EMBODIMENT | | | | | | |
|---|---|---|---|---|---|---|
| BED # | | | | | | |
| A1 | A | DP | LPP | EVAC | PER | RP |
| A2 | PER RP | A | DP | LPP | EVAC | |
| A3 | EVAC | PER RP | A | DP | LPP | EVAC |
| A4 | LPP | EVAC | PER RP | A | DP | |
| A5 | DP | LPP | EVAC | PER RP | A | |

A = Adsorption
DP = Depressurization
LPP = Low Pressure Purge
EVAC = Evacuation
PER = Purge Effluent Repressurization
RP = Repressurization (b) Withdrawing the effluent stream and introducing it to a parallel bed on step 7 of this cycle.

(c) Continuing steps 4(a) and 4(b) for a predetermined cycle time or until the concentration of the more strongly adsorbed component(s) in the effluent stream or the pressure of the parallel bed on step 7 of this cycle reaches a preset limit. The bed is now called "saturated."

5. Evacuation Step, which consists of:

(a) Further raising the pressure in the regenerated bed from the current level (500–760 torr) to adsorption level (30–500 psia) by connecting the product end of the regenerated bed with the product end of a parallel bed on step 1(b) of this cycle.

(b) Discontinuing the above step when the pressure in the regenerated bed has reached the desired level.

(c) This bed is now ready to undergo a new cycle starting at step 1(a) of this cycle.

TABLE 2

PROCESS STEP SEQUENCE FOR SECOND EMBODIMENT

| BED # | | | | | | | | |
|---|---|---|---|---|---|---|---|---|
| A1 | A | | DP1 | DP2 | LPP | EVAC | DER | PER | RP |
| A2 | DER | PER | RP | A | | DP1 | DP2 | LPP | EVAC |
| A3 | EVAC | DER | PER | RP | A | | DP1 | DP2 | LPP |
| A4 | DP2 | LPP | EVAC | DER | PER | RP | A | | DP1 |
| A5 | DP1 | DP2 | LPP | EVAC | DER | PER | RP | A |

A = Adsorption
DP1 = First Depressurization
DP2 = Second Depressurization
LPP = Low Pressure Purge
EVAC = Evacuation
DER = Depressurization Effluent Repressurization
PER = Purge Effluent Repressurization
RP = Repressurization (a) Lowering the pressure of the saturated bed from approximately 15 psia to approximately 40–200 torr by evacuating the gas from the feed end of the bed or by simultaneously evacuating the gas from both the feed and the product ends of the bed.

(b) Storing the evacuated gas which consists of the more strongly adsorbed component(s) at high purity (the second gas product) at ambient pressure for further use.

(c) Part of this gas stream is used for low pressure purge in step 4(a).

6. Depressurization Effluent Repressurization Step, which consists of:

(a) Discontinuing the pressure reduction of the bed. The bed is now called "regenerated" because its capacity for adsorbing the more strongly adsorbed gas component(s) has been restored.

(b) Raising the pressure in the regenerated bed from evacuation level (40–200 torr) to a somewhat higher level (200–500 torr) by connecting the product or feed end of this bed with the effluent end of a parallel bed on step 3(a) of this cycle.

(c) Discontinuing this step when the pressure in the regenerated bed has reached a predetermined level or after a predetermined cycle time.

7. Purge Effluent Repressurization Step, which consists of:

(a) Further raising the pressure in the regenerated bed from the current level (200–500 torr) to a somewhat higher level (500–760 torr) by connecting the product or feed end of this bed with the effluent end of a parallel bed on step 4(b) of this cycle.

(b) Discontinuing this step when the pressure in the regenerated bed or concentration of the more strongly adsorbed component(s) in the effluent from a parallel bed on step 3(b) of this cycle has reached a predetermined level or after a predetermined cycle time.

8. Repressurization Step, which consists of:

FIG. 1 is a schematic diagram of the first embodiment of the present invention wherein 5 beds are operated sequentially in parallel with one another according to Table 1's step sequence. Table 3 outlines FIG. 1's valve sequence for a typical cycle time of 20 minutes. Referring now to FIG. 1, a fresh feed gas stream 100 at a pressure and temperature of approximately 100 psia and 70° F. respectively is mixed with the recycle stream 120 at similar pressure and temperature. The mixed gas 140 is fed to one of the PSA beds, let us say bed A1 via open valve 1. This bed has been previously pressurized to the adsorption pressure of approximately 100 psia. The first gas product comprising the less strongly adsorbed component(s) is withdrawn from bed A1 via open valve 26 in line 160. A part of the first gas product from vessel 320 is removed as a product for export in line 340 and the remainder is recycled in line 300 as repressurization gas. The adsorption step is continued until a fixed time or until the effluent concentration of the more strongly adsorbed component(s) from bed A1 has reached a predetermined level. At the end of the adsorption step, the feed gas stream is directed to the second bed, let us say bed A2. Bed A1 is now depressurized to approximately 15 psia cocurrently to the feed gas stream flow via open valve 16. The desorbed gas from bed A1 is recompressed to the adsorption pressure of approximately 100 psia by the recycle compressor 180 and is mixed with the fresh feed gas stream before entering bed A2, which is on the adsorption step.

At the end of the depressurization step, the more strongly adsorbed component(s) are used to purge bed A1 cocurrent to the feed gas stream flow via open valves 6 and 21 and line 200. The effluent from this low pressure purge step is introduced into bed A4 via open valve 24. Bed A4 has just finished evacuation and is at a pressure of approximately 100 mmHg.

Following the low pressure purge step, bed A1 undergoes pressure reduction by evacuation via open valve 11 through line 220. The pressure in bed A1 is reduced from approximately 15 psia at the end of the low pressure purge step to approximately 100 mmHg at the end of the evacuation step by means of vacuum pump 240. The evacuated gas contains the more strongly adsorbed component(s) of the gas mixture and is at a pressure of approximately 1 atmosphere. Part of this gas is used for the low pressure purge step while the remainder is removed from vessel 260 as the second gas product in line 280. Bed A1 is then partially repressurized by introducing the low pressure purge effluent from bed A3 via open valves 21 and 23. Finally, Bed A1 is fully repressurized to the adsorption pressure with the first gas product stream via open valves 21 and 31 and line 300. Bed A1 is now ready to undergo another cycle starting from the adsorption step.

tions; and 13X zeolite for $H_2/CH_4/CO_2/N_2/CO$ separations wherein $H_2$ is the first gas product containing an acceptable $CH_4$ impurity and $CO_2$ is the second gas product containing an acceptable $CH_4$ impurity.

The present invention has been described with reference to two specific embodiments thereof. These embodiments should not be viewed as a limitation to the present invention, the scope of which should be ascertained by the following claims.

I claim:

1. In a pressure swing adsorption process for the recovery of two gas products at high recovery and high purity from a feed gas stream containing said products wherein a first gas product is one or more, less strongly adsorbed components and a second gas product is one

TABLE 3

Valve Sequence for FIG. 1

| Time (min) | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 0-2 | o | | | | | | | o | | | | | o | | | | | | | o |
| 2-4 | o | | | | | | | | | | | | o | o | | | | | | o |
| 4-6 | | o | | | | | | | | o | | | | o | | o | | | | |
| 6-8 | | o | | | | | | | | | | | | o | o | o | | | | |
| 8-10 | | | o | | o | | | | | | | | | o | | | o | | | |
| 10-12 | | | o | | | | | | | | o | | | o | | | o | | | |
| 12-14 | | | | o | | o | | | | | o | | | | | | | o | | |
| 14-16 | | | | o | | | | | | | o | o | | | | | | o | | |
| 16-18 | | | | | o | | o | | | | o | | | | | | | | o | |
| 18-20 | | | | | | o | | | | | o | o | | | | | | | o | |

| Time (min) | 21 | 22 | 23 | 24 | 25 | 26 | 27 | 28 | 29 | 30 | 31 |
|---|---|---|---|---|---|---|---|---|---|---|---|
| 0-2 | | o | | o | | o | | | | | |
| 2-4 | | o | | | | o | | | | | o |
| 4-6 | | | o | | o | | o | | | | |
| 6-8 | | | o | | | | o | | | | o |
| 8-10 | o | | | o | | | | o | | | |
| 10-12 | | | | o | | | | o | | | o |
| 12-14 | | o | | | o | | | | o | | |
| 14-16 | | | | | o | | | | o | | |
| 16-18 | o | o | | | | | | | | o | |
| 18-20 | o | | | | | | | | | o | o | o — open, otherwise closed

EXAMPLE

A feed stream containing hydrogen (67.7%), carbon monoxide (32%), methane (0.2%) and nitrogen (0.1%) at approx 200 psig and 70° C. was used to produce high purity primary product (hydrogen) and secondary product (carbon monoxide) streams when fractionated pursuant to the prior art cycle. Based upon the lab data for the prior art cycle, it is estimated that the first and second embodiments of the present invention will require 8% and 12% less power respectively to produce similar purity (99%+) carbon monoxide streams.

Any adsorbent which can selectively adsorb the secondary gas product from the first gas product can be used. The key adsorptive properties are (i) high selectivity, (ii) high working capacity, (iii) fast kinetics, and (iv) low heat of adsorption. Typical examples are zeolites, carbons, aluminas, or silica gels. Other desired properties of the adsorbents are (i) high crush strength, (ii) high attrition resistance, (iii) large bulk density, (iv) low interparticle void, (v) high heat capacity, (vi) large thermal conductivity, and (vii) small particle size. Pressure drop through the adsorbent beds during adsorption, purge, and evacuation steps are also important properties for adsorbent selection. Exemplary adsorbents for specific gas separations are 13X zeolite for $CH_4/CO_2$ and $N_2/CO_2$ separations; an activated carbon for $H_2/CH_4$ separations; CaX zeolite for $O_2/N_2$ separations;

or more, more strongly adsorbed components, and wherein said process comprises the steps of:

(a) introducing a feed gas stream at elevated pressure containing said one or more, less strongly adsorbed components and said one or more, more strongly adsorbed components into one of a plurality of parallel adsorptive beds filled with one or more adsorbents selective for said one or more, more strongly adsorbed components, so as to retain said one or more, more strongly adsorbed components on said one or more adsorbents and allow said one or more, less strongly adsorbed components to pass through said bed for recovery as said first gas product at high recovery and high purity;

(b) terminating the introduction of said feed gas stream into said bed before said one or more, more strongly adsorbed components break through the downstream end of said bed and depressurizing said bed to approximately ambient pressure to remove said one or more, less strongly adsorbed components from said bed and recycling at least a portion of the resulting depressurization effluent to said feed gas stream;

(c) passing a low pressure purge gas stream of one or more, more strongly adsorbed components through said bed to remove any residual one or more, less strongly adsorbed components from said bed;

(d) evacuating said bed to a subambient pressure to recover said one or more, more strongly adsorbed components as said second gas product at high recovery and high purity; and (e) repressurizing said bed with one or more, less strongly adsorbed components to approximately the pressure of the feed gas stream, wherein the steps (a) through (e) are performed on said plurality of beds to result in a continuous process; the improvement to increase the energy efficiency of the process comprising a purge effluent repressurization step wherein said bed is partially repressurized after step (d) and prior to step (e) with the effluent from one of said parallel beds presently undergoing step (c).

2. The process of claim 1 wherein the improvement further comprises a depressurization effluent repressurization step wherein said bed is partially repressurized after step (d) and prior to the purge effluent repressurization step with a last portion of the effluent from one of said parallel beds presently undergoing step (b).

3. The process of claim 1 wherein the elevated pressure of said feed gas stream is in the range of approximately 30 to 500 psia.

4. The process of claim 1 wherein the depressurization is conducted down to a pressure of approximately 15 psia.

5. The process of claim 1 wherein the evacuation is conducted down to a pressure in the range of approximately 40 to 200 torr.

6. The process of claim 1 wherein said less strongly adsorbed components and said more strongly adsorbed components are selected from the group consisting of hydrogen, oxygen, carbon dioxide, nitrogen, carbon monoxide, methane, and other hydrocarbons.

7. The process of claim 1 wherein the adsorbent is selected from the group consisting of zeolites, carbons, aluminas and silica gels.

8. The process of claim 1 wherein the feed gas temperature is in the range of approximately 0° to 300° F.

* * * * *